Feb. 18, 1936. C. A. WELLER 2,031,083
GUIDE OR SUPPORT FOR MOLTEN GLASS
Filed Jan. 21, 1933
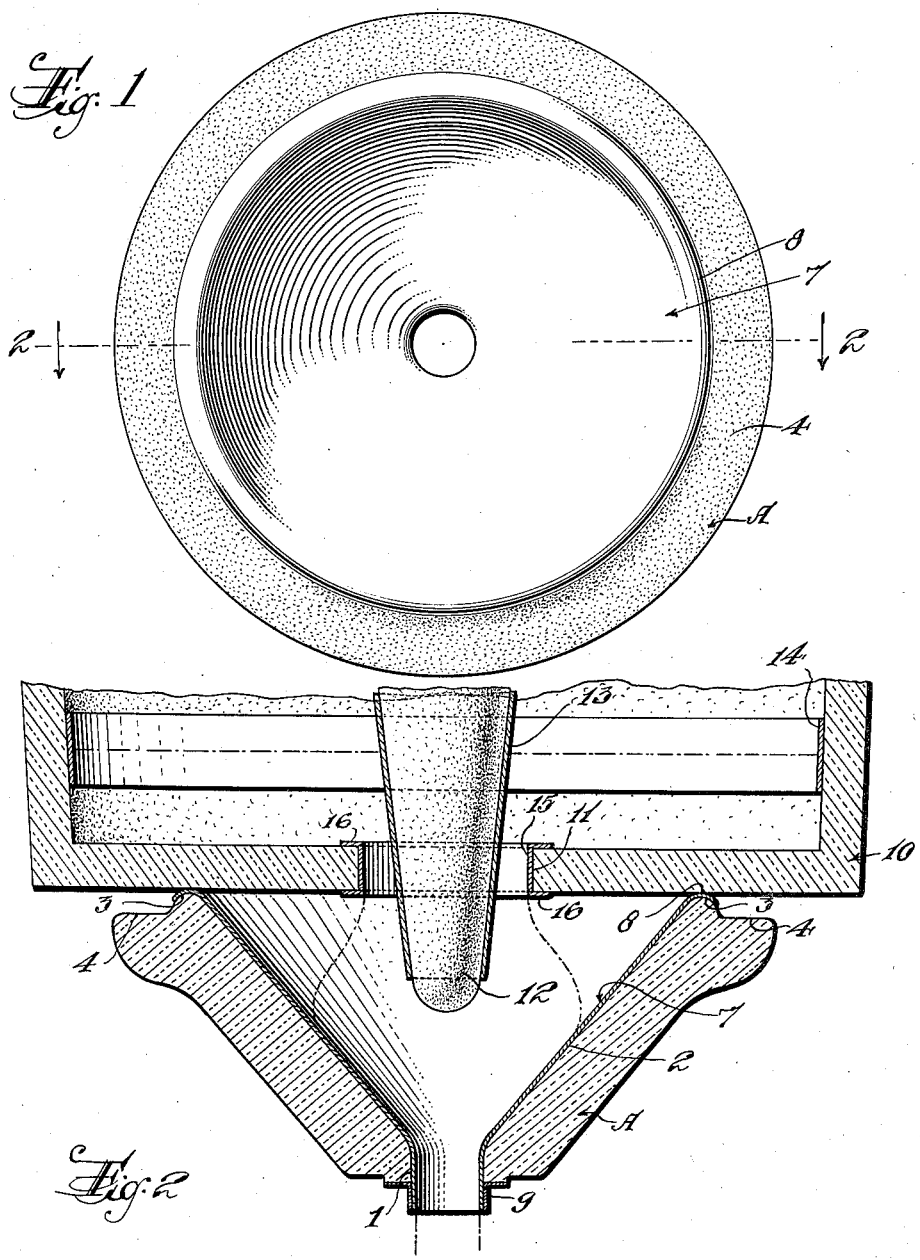
INVENTOR
Charles A. Weller,
BY
Harry B. Rook,
ATTORNEY Patented Feb. 18, 1936

2,031,083

UNITED STATES PATENT OFFICE 2,031,083

GUIDE OR SUPPORT FOR MOLTEN GLASS

Charles A. Weller, Bloomfield, N. J., assignor, by direct and mesne assignments, of one-half to Baker & Company, Inc., Newark, N. J., a corporation of New Jersey, and one-half to Westinghouse Electric and Manufacturing Company, a corporation of Pennsylvania Application January 21, 1933, Serial No. 652,816

4 Claims. (Cl. 49—55)

This invention relates in general to refractory bodies, such as feeders, tanks, vats, needles and the like which are used for example in the manufacture of glass or handling of glass in molten or plastic condition, especially glass in molten or liquid state at high temperatures, particularly molten glass that is capable of flowing by gravity and of wetting metal. More particularly the invention relates to a refractory feeder having an opening therethrough which is utilized to receive molten or plastic glass from a furnace, and shape it into the suitable form for use and feed it to a desired point.

In the passage of molten glass or other molten materials through an opening in a refractory feeder, the feeder becomes worn by the frictional contact between the molten material and the walls of the opening in the feeder, and chemical distintegration of the refractory occurs. Such chemical disintegration also occurs at the point of contact of molten glass with the walls of refractory vats especially where said contact occurs at the surface of the glass in the atmosphere. Such conditions also obtain in connection with refractory needles or valves used to control the flow of molten glass through an outlet opening from a vat or tank.

Furthermore, the rough surface of the refractory material offers considerable frictional resistance to the passage of the molten material thereover.

The prime object of my invention is to overcome the above-mentioned difficulties incident to the use of refractory feeders, vats, needles and the like with molten material, particularly molten glass; and to accomplish this object I propose to utilize a novel and improved metallic liner for the opening in a feeder, or a sheath for a needle or the like, or a lining strip or a deposit of metal on the wall of a vat or the like covering the area over which the level of the molten material may vary during normal operation, whereby a longer and more uniform operation of the feeder, needle, or vat shall be ensured, a saving of fuel for heating the molten material shall be possible by elimination of the necessity for varying the temperatures to accommodate variations in the size of the feeder openings or needles caused by wear or disintegration, and time and expense can be saved by the reduction in the extent and frequency of repairs and adjustments during operation of the die feeder, needle or vat.

Such a liner, sheath, lining strip or deposit to be satisfactory should be capable of withstanding for long periods extremely high temperatures for example from 1000 degrees C. to 1600 degrees C. or 1800 degrees F. to 2800 degrees F.; it should be capable of resisting chemical disintegration and abrasion so as to wear longer than a refractory feeder, needle or vat without a liner or sheath; it should have a smooth surface so as to cause only a minimum of frictional resistance to passage of the molten material thereover; it should be hard and rigid so as to retain its shape, and it should not contaminate the molten material as by depositing thereon chemical compounds. Moreover in the extrusion of molten glass through openings in metal lined refractories it is desirable that both the metal used and the refractory have approximately equal rates of expansion and contraction with temperature changes to avoid changes in relative dimensions or fractures of one or both. In cases where the metal liner is first formed and the plastic refractory applied thereto and fired, this relation of dimensional change with temperature variation is especially important.

Accordingly, other objects of my invention are to provide such a liner, sheath, metal deposit or metal body for use in contactual relation to molten glass which shall be formed of a metal or a metallic alloy which shall be hard and rigid so as to resist abrasion and retain a desired shape and yet shall have sufficient ductility to permit shaping thereof into the desired configurations, which shall have a smooth surface to cause only a minimum of frictional resistance to passage of molten material thereover, shall resist chemical distintegration from contact with the molten material and/or from high temperatures, shall have a coefficient of expansion approximately equal to the refractory with which the alloy is to be used, and shall be capable of use for long periods of time; to provide such a liner, sheath or deposit the metal or alloy of which shall not contaminate the molten glass as by the formation on the surface of the liner, sheath or deposit of chemical compounds which might adhere or dissolve in the glass; and to obtain other advantages and results as will be brought out by the following description.

For the purpose of illustrating the principles of the invention, I have shown the invention in the accompanying drawing with a liner and a needle for a refractory feeder such as is used in extruding or shaping a mass of molten glass into rope-like or cylindrical form; although it should be understood that the invention is susceptible of use for other purposes in contactual relation with molten glass.

Referring to said drawing in which corresponding and like parts are designated throughout the several views by the same reference characters.

Figure 1 is a top plan view of a refractory feeder for use in extruding or shaping a mass of molten glass into cylindrical form and having a liner embodying my invention.

Figure 2 is a transverse vertical sectional view through the feeder and liner taken on the line 2—2 of Figure 1, and showing a portion of a vat and a needle for controlling the flow of molten material from the vat to the feeder.

Specifically describing the illustrated embodiment of the invention, the reference character A designates a feeder formed of any suitable refractory material capable of withstanding high temperatures, for example, temperatures of over 2800 degrees F. The feeder has a central cylindrical opening 1 therethrough for the passage of a stream of molten glass, and the walls of the opening at the upper end thereof flare outwardly at 2 into an annular and convex surface 3 on the top side of the feeder which merges into and is surrounded by an annular flat surface 4.

In one use of such a feeder according to known practice, a mass of molten glass is deposited in the flared end of the opening 1 and is forced through the opening under pressure or by gravity so that the glass emerges from the lower end of the opening in cylindrical form. Pieces of the molten glass cylinder are then cut off for use as desired. Obviously, the use for which the feeder and liner, and the glass, are adapted, is immaterial to the invention, and the structure and use described are illustrative of only one possible embodiment of the invention.

The molten glass must be handled at high temperatures for example from 1800 degrees F. to 2800 degrees F., and during operation of the feeder, the refractory material disintegrates both under abrasion from frictional contact of the flowing glass with the walls of the opening 1 and from chemical action, so that the opening is enlarged and the feeder becomes useless in a short period of time as already pointed out. Furthermore, the walls of the opening 1 are rough and impede the flow of the glass through the opening.

To overcome these difficulties, I utilize a novel and improved metallic liner for the opening 1 to prevent contact of the molten glass with the walls of the opening 1.

This liner is arranged in said opening 1 and comprises a metallic funnel shaped or tubular body 7 which has one end outwardly flared into a flange 8 to nicely fit upon the flared end of the opening and the annular convex surface 3 on the top of the feeder, and the other end projecting from said opening at the bottom of the feeder. A thimble or flanged sleeve 9 is fitted on the tube 1 to abut the bottom of the feeder and in conjunction with the flange 8 hold the liner against displacement from the feeder.

The feature of my invention of prime importance is the metal or alloy of which the liner is formed in order that the liner shall withstand for long periods the high temperatures at which the molten glass is passed through the feeder, shall be hard and rigid so as to resist abrasion and retain a desired shape and yet shall be sufficiently ductile so that it can be shaped into any desired configuration, shall have and retain a smooth surface to cause a minimum of frictional resistance to the flow of the molten glass thereover, shall resist chemical disintegration from contact with the molten glass and/or high temperatures, shall be capable of use for long periods and shall not contaminate the glass. I have discovered that an alloy of platinum and rhodium is admirably suitable for the liner, particularly such an alloy containing a major portion, of platinum, particularly about eighty (80) percent of platinum, and specifically an alloy consisting of approximately ninety (90) percent platinum and ten (10) percent rhodium. This alloy will withstand for long periods of time without material deterioration, temperatures of from 1800 degrees F. to 2800 degrees F., the melting point of the alloy being approximately 3270 degrees F. The alloy will not oxidize in air under these high temperatures or in contact with molten glass, and little or no chemical disintegration of the alloy will occur during use. Accordingly, the alloy will not contaminate the molten glass which contacts with the alloy, nor will there be any loss of the alloy.

The alloy is hard, having a Brinell hardness of about 90 when annealed. Therefore, the alloy will effectually resist abrasion by the molten glass, can be highly polished and will retain a smooth surface for long periods of time so as to cause a minimum of frictional resistance to the flow of the molten glass. The grain structure of the alloy is fine, and during use under high temperatures the crystal development is slow so that the crystals remain small, the rhodium retarding the crystallization of the platinum so that the alloy has a long life.

As above indicated, the invention is also adapted for use with vats and needles, and for the purpose of illustrating such use, I have shown in Figure 2 a vat 10 formed of refractory material from which molten glass might be supplied through an outlet opening 11 to a feeder A above described. It is customary to use with such a vat, a needle or valve 12 formed of refractory material for controlling the flow of molten material through the outlet opening 11, and the molten material tends to wear away the refractory needle in flowing thereunder, just as molten material wears away the usual refractory feeder. Also at the point where the surface of the molten material contacts with the refractory needle in the atmosphere, chemical disintegration of the needle occurs. To overcome these difficulties, a sheath 13 composed of the metal or alloy constituting my invention may be fitted upon the needle, particularly the portions thereof which move through the outlet opening 11, and the portions thereof at the surface of the molten material exposed to the atmosphere.

Chemical disintegration of the refractory material of which the vat is formed sometimes also occurs at the point where the material at its surface contacts with the walls of the vat in the atmosphere, and to prevent this disintegration, a strip 14 composed of the metal or alloy constituting my invention, or a deposit of such metal, may be applied to the inner walls of the vat 10 over the area thereof at which the normal surface level of the molten material is located. It will be understood, that the illustrations of the vat 10 and needle 12 are intended only to illustrate the use of my invention, and that the exact form and shape of the vat and needle, as well as the particular association thereof with a feeder, will in practice vary according to the use to which the vat, needle and feeder are applied.

A liner embodying my invention may also be applied to the walls of the outlet opening 11 of the vat, and such a liner may consist of a tube 15 fitted into the opening and having end flanges 16 overlying the inner and outer sides of the bottom wall of the vat for protecting the edges of the opening and holding the liner in position.

From the foregoing, it will be understood, that a liner embodying the invention will effectually protect a refractory feeder, needle, vat or other refractory surfaces for long periods of time against injury from abrasion and chemical disintegration in contact with molten glass, and the flow of molten glass through a feeder opening will be greatly expedited by the smooth surface of the liner. Therefore, the liner will greatly reduce the cost of operation of refractory extruding or shaping feeders, needles and vats used in the manufacture of articles from molten glass.

The alloy also has sufficient ductility with the other desired characteristics, so that it can be easily worked and shaped into any desired configuration, for example to form liners for different types of devices.

While I have described the alloy as including certain proportions of platinum and rhodium I do not desire to be limited to the exact proportions enumerated, and while I have described a liner of a particular form for a particular purpose, it should be understood that it is within the scope of the invention to vary the form of the liner and to use it for different purposes under conditions similar to those described. In the appended claims, the term "part" is intended to include all such parts or portions as the liner 7, the tube 15, a sheath such as the sheath 13, a lining strip or metal deposit such as that designated 14, and above described, and like structures.

Having thus described my invention, what I claim is:

1. In the manufacture and handling of glass, a metallic part required to be in direct contactual relation with molten glass in such a state that the glass is capable of flowing and wetting metal, said part formed of an alloy of platinum and rhodium, wherein platinum constitutes the major portion.

2. In the manufacture and handling of glass, a metallic part required to be in direct contactual relation with molten glass in such a state that the glass is capable of flowing and wetting metal, said part formed of an alloy of platinum and rhodium wherein platinum constitutes at least eighty (80) percent of the alloy.

3. In the manufacture and handling of glass, a metallic part required to be in direct contactual relation with molten glass in such a state that the glass is capable of flowing and wetting metal, said part formed of an alloy of platinum and rhodium in the proportions of from eighty (80) percent to ninety-nine (99) percent of platinum and from one (1) percent to twenty (20) percent of rhodium.

4. In the manufacture and handling of glass a metallic part required to be in direct contactual relation with molten glass in such a state that the glass is capable of flowing and wetting metal, said part formed of an alloy consisting of ninety (90) percent platinum and ten (10) percent rhodium.

CHARLES A. WELLER.